US006202118B1

(12) United States Patent
Klein

(10) Patent No.: US 6,202,118 B1
(45) Date of Patent: Mar. 13, 2001

(54) APPARATUS FOR ADDRESS TRANSLATION TO SELECTIVELY IMPROVE DATA TRANSFER RATES ON A DISK STORAGE DEVICE

(75) Inventor: Dean A. Klein, Eagle, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 08/926,797

(22) Filed: Sep. 10, 1997

(51) Int. Cl.[7] .................................................. G06F 12/10
(52) U.S. Cl. ............................... 711/4; 711/112; 711/206; 711/219; 711/154
(58) Field of Search .............................. 711/4, 112, 203, 711/206, 219, 154

(56) References Cited

U.S. PATENT DOCUMENTS

| 4,680,703 | 7/1987 | Kriz ....................................... 711/112 |
| 4,750,059 | 6/1988 | Syracuse ................................. 360/48 |
| 5,119,291 | 6/1992 | Flannagan et al. ....................... 711/4 |
| 5,333,311 | 7/1994 | Whipple, II ............................ 707/205 |
| 5,345,575 | 9/1994 | English et al. ......................... 711/112 |
| 5,422,762 | 6/1995 | Jerbic ..................................... 360/48 |
| 5,426,758 | 6/1995 | Candelaria et al. ................... 711/112 |
| 5,463,758 | * 10/1995 | Ottesen ................................ 711/114 |
| 5,574,881 | 11/1996 | Yasuoka et al. ...................... 711/112 |
| 5,584,018 | 12/1996 | Kamiyama ............................ 711/165 |
| 5,774,714 | * 6/1998 | Thapar et al. ....................... 707/100 |
| 5,873,125 | * 2/1999 | Kawamoto ........................... 711/202 |

OTHER PUBLICATIONS

"Logical Memory Addressing and Memory Acess," Chapter 3 (pp. 69–135) in *The Indispensable PC Hardware Book*, Hans–Peter Messmer, Wokingham: Addison–Wesley, 1995.
"Floppies and Floppy Drives," Chapter 27 (pp. 651–730) in *The Indispensable PC Hardware Book*, Hans–Peter Messmer, Wokingham: Addison–Wesley, 1995.
"Hard Disk Drives," Chapter 28 (pp. 731–838) in *The Indispensable PC Hardware Book*, Hans–Peter Messmer, Wokingham: Addison–Wesley, 1995.

* cited by examiner

Primary Examiner—Reginald G. Bragdon
(74) Attorney, Agent, or Firm—Dorsey & Whitney LLP

(57) ABSTRACT

The overall transfer rate of user data is improved with the translation of certain low-number logical addresses into higher number physical addresses in order to displace inward the low-number logical data (e.g., low-level data). This makes it possible to store at least some user data on the higher transfer rate, outer cylinders. The sequence of the resulting physical addresses is changed relative to the logical addresses.

49 Claims, 6 Drawing Sheets

APPARATUS FOR ADDRESS TRANSLATION TO SELECTIVELY IMPROVE DATA TRANSFER RATES ON A DISK STORAGE DEVICE

This application is related to an application titled A METHOD FOR IMPROVING DATA TRANSFER RATES FOR USER DATA STORED ON A DISK STORAGE DEVICE Ser. No. 08/927,233, filed on Sep. 10, 1997, now U.S. Pat. No. 6,026,463, issued Feb. 15, 2000.

TECHNICAL FIELD

The present invention relates generally to the improvement of data storage on a disk storage device. In particular, the invention involves translating disk storage unit addresses so that low-level data (e.g., file allocation tables (FATs), operating system), which is customarily stored on the low-number (outer) physical cylinders, is stored on higher-number (inner) physical cylinders, thereby leaving the outer, higher data rate cylinders available for user data.

BACKGROUND

General Background

FIGS. 1 and 2 depict a top view of a disk 26 in a hard disk drive 20.

In the Figures, only one disk is shown; however, a disk drive typically includes multiple disks, which rotate together about a common spindle 24. Each disk 26 is coated with magnetic material for storing the digital information to be recorded. One read/write head 23 is provided for each disk surface. Each head 23 is mounted on a common actuator 22, which is moved in discrete increments to locate the head 23 on a particular disk track 27. Tracks lying nearer the spindle 24 are referred to "as "inner" tracks, while those with a larger radius located near the outer periphery of disk 26 are called "outer" tracks.

A group of disk tracks with a common radius is typically referred to as a cylinder. As an example, with a drive having one disk with two sides, each cylinder would consist of two tracks. On the other hand, a drive having six two-sided disks would include cylinders consisting of 12 tracks.

Each track is divided into sectors, with each sector storing multiple (usually 512) bytes of data. In addition, sectors may be further organized into clusters or blocks, which are groupings of a like-number of consecutive sectors (e.g., 4 sectors per cluster and 16 sectors per block). A sector is usually the smallest physically addressable storage unit of a disk drive. (The term "storage unit" is used herein to generically connote a unit of memory. A storage unit would include, for example, a sector, a cluster, or a block.) A particular sector is physically referenced by its cylinder, head and sector numbers (e.g., cylinder 0, head 0, sector 1).

The number of sectors per track is determined when the disk is formatted by a low-level formatting program. Traditionally, each track would include the same number of sectors, thereby making it simpler for a host computer via its operating system and BIOS to transfer data between itself and the disk drive. However, with such homogeneity, the byte density per unit of length decreases as track lengths increase, going from the inner (higher number) cylinders to the outer (lower number) cylinders. Thus, it is an inefficient use of cylinder space to assign each track the same number of sectors. Therefore, disk drives are now formatted so that the number of sectors per track increases as the cylinder radius increases.

To do this, a disk is usually divided into zones, with each zone having a like number of sectors per track and with the number of sectors per track changing from zone to zone and not necessarily from track to track. (Although, a zone could be defined to include only one cylinder.) This is known as zone bit recording ("ZBR"). ZBR enables systems to increase the available memory storage capacity of disk drives.

With ZBR, however, more complex disk drive accessing methods are required, because disk drive geometries (including the number of sectors per particular track) can vary from drive to drive. For this reason, computer systems utilize logical addressing, whose operability does not depend upon a particular disk drive geometry.

Disk drive space may be formatted into several distinct sections known as partitions. For example, a computer with multiple operating systems and one disk drive must allocate to each operating system a separate, dedicated "partition" of the disk drive. Typically, each partition consists of some definable group of contiguous cylinders. Due to ZBR, the number of sectors for a particular track can vary both within a single partition and between partitions. Logical addressing becomes a virtual necessity to deal with these variations. With logical addressing, a host computer (on a system level) can transfer data into and out of a logical address that corresponds to a physical storage unit for a given disk drive partition, without having to know the storage unit's actual physical address. The logical address is translated into its corresponding physical address via a logical to physical translation. The logical to physical translation is customarily performed either by the computer on a sub-system level (i.e., through the BIOS), by a dedicated disk drive controller, or (as is the case with an SCSI disk drive in connection with a DOS system) by both the computer and the disk drive controller.

With a standard logical to physical translation, the logical addresses, beginning with the lowest address, are sequentially mapped, in ascending order, onto the physical sectors of a partition, beginning with the partition's lowest physical sector (i.e., lowest cylinder, head, sector combination). For example, with a disk drive having a single partition, logical storage unit address 1 would correspond to physical address: cylinder 0, head 0, sector 1. (While some specific logical storage unit types, e.g., logical sectors, may begin with logical address 0, the generic storage units of this specification have been deemed to begin with storage unit 1. Thus, logical storage unit address 1 is the lowest logical "storage unit" address.) The order of the physical sectors from lowest to highest, progresses first through the sectors of cylinder 0, head 0, then through the sectors of cylinder 0, head 1 and so on until reaching the last sector in the last head of cylinder 0. Next would come cylinder 1, head 0, sector 1. This progression continues inward through each cylinder with the last sector of the last head of the innermost cylinder being the highest physical cylinder. It can be seen that with a standard, sequential logical to physical translation (or mapping), low logical number addresses correspond to outer physical sectors and high logical addresses correspond to high number (inner) physical sectors, as is shown in FIG. 6A. The sequential order of the logical addresses is mirrored in the corresponding sequence of physical addresses.

With operating systems such as DOS or Windows 95, when data is first transferred from a host computer to a disk drive, it is typically loaded into the lowest available logical storage unit address. Because low-level data (i.e., partition information, boot sector, FATs, directories, and operating system) is the first data to be stored on a disk drive partition (during configuration), it is stored in the low-number logical address storage units, which correspond to the outer cylinders of the partition.

The partition information is stored in the partition sector, which is the first sector of the partition. Next comes the boot sector, the FATs and the directories. After the directories comes the operating system, which constitutes most of the low-level data. After the low-level data has been loaded, the partition can start accumulating user data in response to the needs of a user. User data, which includes all data other than low-level data, is typically stored beginning at the logical storage unit immediately following the last logical storage unit utilized for storing the low-level data. Thus, the logical (and, likewise, physical) sequence and location of particular user data depends upon its relative order of storage onto the partition.

Disk Storage Optimization

Disk drive performance is normally evaluated based on several characteristics including seek time, latency, and data transfer rate. The seek time is the average time required for a read/write head to move from its current cylinder to a randomly selected cylinder; latency is the average time required for the head to move from its current sector to a selected sector; and the data transfer rate corresponds to the rate at which data is actually transferred between the disk storage device and a host computer once the head is in position at the sector or group of sectors to be accessed.

These performance characteristics are primarily affected by the physical design of the disk drive. However, it is usually not feasible for users and computer designers to enhance performance by modifying the drive's physical design or even by simply upgrading its components. It is, however, feasible to modify how data is organized and where it is physically stored on the disk drive. In fact, storage schemes have been devised to improve some of the performance characteristics for these devices.

For example, in one method, disk files are monitored during use and prioritized based upon how frequently they are (or are anticipated to be) accessed and/or modified. The files are then written or rewritten on the disk, with files having similar priority stored proximate to one another, thereby reducing seek and latency.

In another scheme, the directory sectors are physically relocated to the middle cylinder of the disk drive and the FAT sectors are physically distributed to be next to the user file sectors, which they serve. This relocation reduces the overall head seek time by reducing the expected distance required for the read/write head to move. In addition, the two FAT copies are spatially distributed to opposite sides of the track 180 degrees apart from one another. When a read process occurs, the FAT that is closest to the read/write head is utilized, which reduces the latency for FAT access from ½ to ¼ of a rotation.

Unfortunately, however, while these methods reduce seek and latency times, they fail to address the rate at which data is transferred once the head is aligned with its selected sector. A user may have particular applications in which the speed of transfer of user data is important. Therefore, what is needed is a feasible disk storage scheme that improves data transfer rates for user data stored on a disk storage device.

SUMMARY

An ancillary property of zone bit recording (as well as of any other formatting scheme where more sectors are allocated to larger diameter cylinders) is that data transfer is faster on the larger diameter, lower number cylinders, because more sectors pass by the read/write head during a given period of time. (A memory storage disk rotates at a constant speed regardless of the particular cylinder being accessed.)

Accordingly, the overall transfer rate of user data is improved with the translation of certain low-number logical addresses into higher number physical addresses in order to displace inward the low-number logical data (e.g., low-level data). This makes it possible to store at least some user data on the higher transfer rate, outer cylinders. The sequence of the resulting physical addresses is changed relative to the logical addresses.

DETAILED DESCRIPTION a. General Overview

Figure 1:
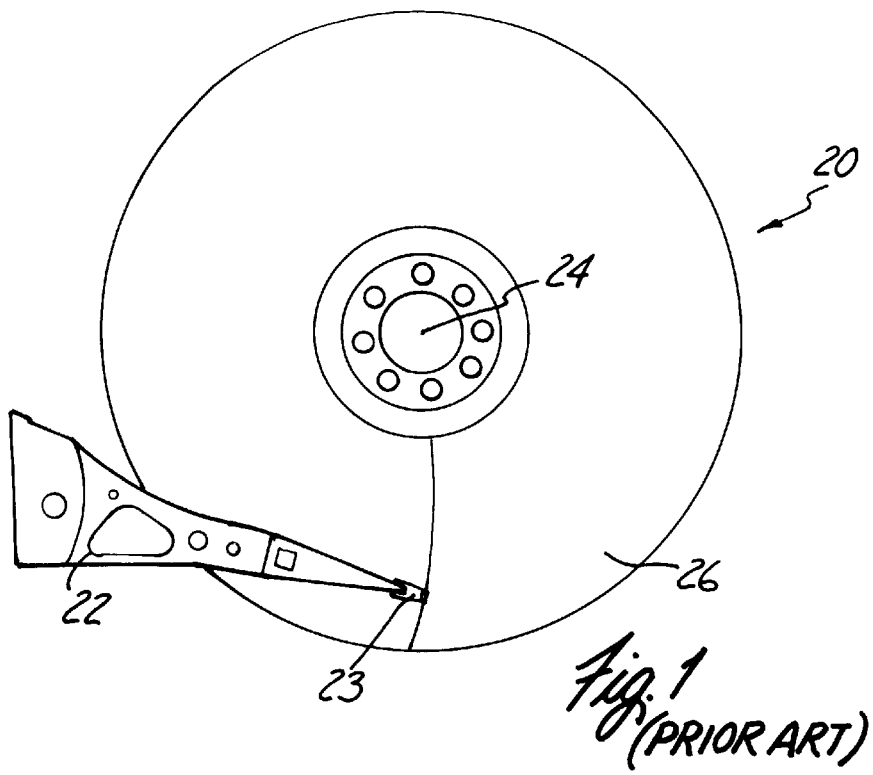
FIG. 1 is a top view of a disk drive.
Figure 2:
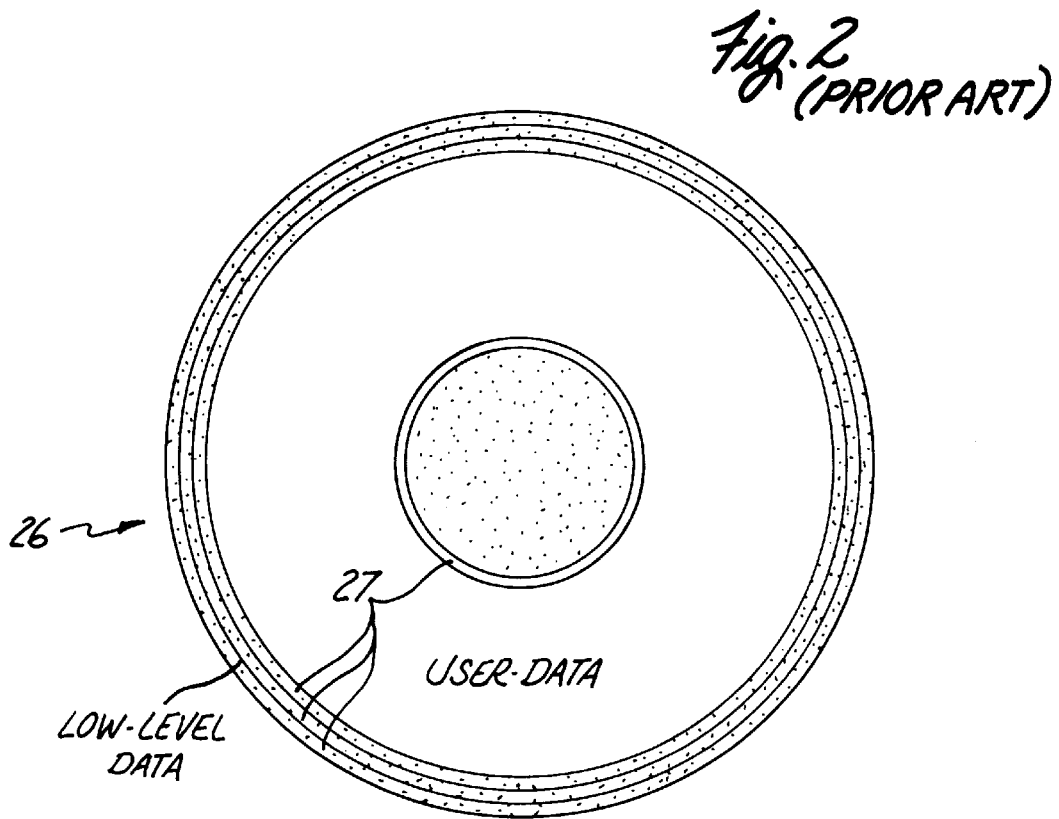
FIG. 2 is a top view of a disk from a disk storage device.
Figures 3, 5:
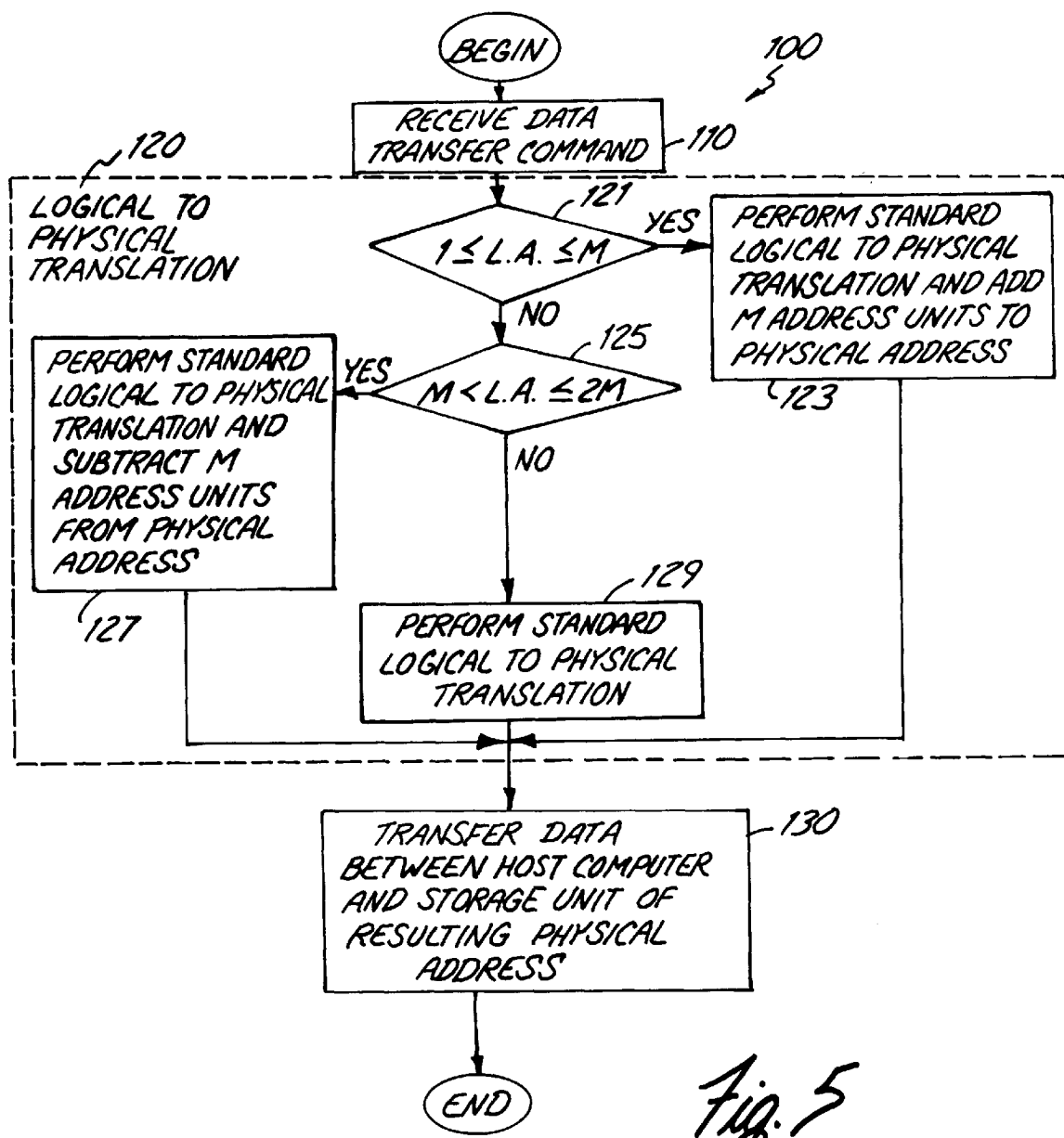
FIG. 3 is a block diagram of a system for implementing the present invention.
FIG. 5 is a flow chart depicting a routine for implementing an embodiment of the present invention.

FIG. 3 shows a block diagram of a disk drive controller 30 connected between a host computer 50 and a disk drive 20. (While embodiments of the present invention are described in terms of a disk drive, it should be recognized that the invention may be applied to any disk storage device. A disk storage device is a memory storage device that stores information on at least one disk that includes concentric tracks comprised of storage units for storing the information. Disk storage devices include but are not limited to hard disk drives (see FIG. 1), floppy disks and compact disks.) The controller 30 serves as an interface enabling data to be transferred between the host computer 50 and the disk drive 20. With some embodiments (e.g., an SCSI disk drive), a host adaptor (not shown) may be required between the host computer 50 and the disk drive controller 30. The controller 30 has associated memory 35, which stores program instructions that when executed by the controller enable it to oversee the transfer of data between the host computer 50 and the disk drive 20. Additionally, the controller 30 can perform all or part of a logical to physical translation in order to implement the disk storage method of the present invention.

b. Displacement by Substituting or "Swapping" Addresses

A transfer of data is initiated by a data transfer command issued by the host computer 50. A transfer command is any instruction or instructions used by a host computer to write data to or read data from a disk storage device. Such a command will include at least one logical address that corresponds to a storage unit of the disk storage device. The logical address must be translated into an actual physical address that can be accessed by a read/write head 23 of the disk drive 20.

Figure 4:
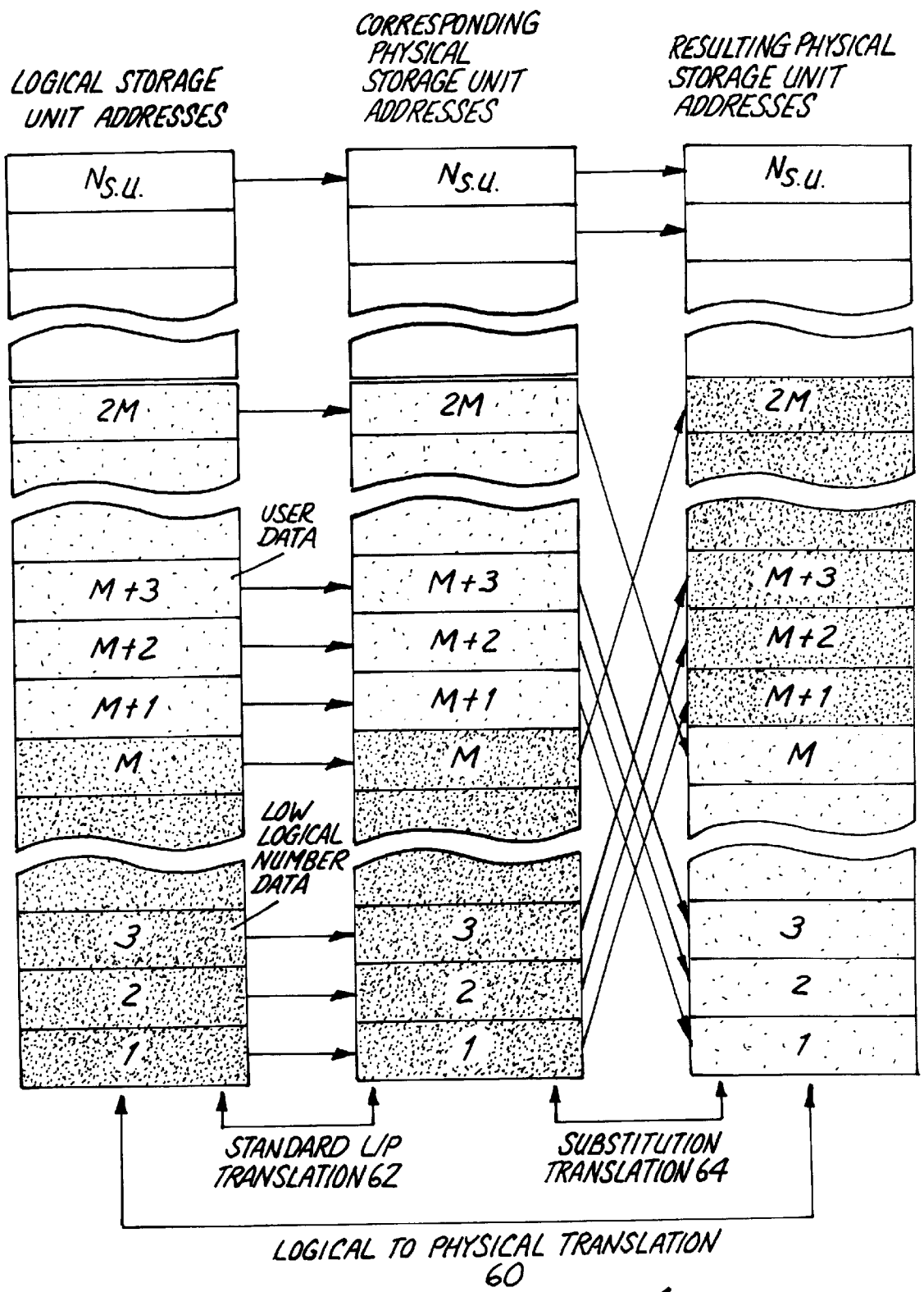
FIG. 4 is a graphical representation of the logical to physical translation performed by the routine of FIG. 5.

FIG. 4 graphically illustrates one embodiment of a logical to physical translation 60 for implementing the present invention, whereby selected low logical number data is not written to the outermost physical storage units but rather is displaced to specified inner storage units. The data displaced is of a first type deemed to have less need for the high data transfer rates available at the outer cylinders. The embodiment comprises two cascaded translations: a standard logical to physical translation 62 and a substitution translation 64. The standard logical to physical translation 62 is performed on the logical storage unit address from a transfer command to produce a corresponding physical address. As can be seen in FIG. 4, sequence of the logical addresses is preserved in the corresponding physical addresses. The substitution translation 64 is then performed on the corresponding physical address, thereby producing a resulting physical address that displaces the low-number logical data (which includes low-level data) into higher number physical storage units in order to reserve the outer physical cylinders of the partition for user data. In this translation, the sequence of the logical addresses is no longer preserved; the resulting physical addresses for the displaced data are no longer in the same sequence.

In effect, a substitution translation is the "swapping" of selected sets of addresses. It is a mapping or translation that redirects data intended for a first set of logical or physical addresses into a second set of logical or physical addresses. In turn, data intended for the second set of logical or physical addresses is redirected into the first set of logical or physical addresses. Due to the displacement, the normal sequential nature of the standard logical to physical translation is changed. A substitution translation may be implemented in various ways, including by mathematically modifying a standard logical to physical translation or by mapping (via a table or otherwise) storage unit addresses before or after they are translated with a standard logical to physical translation.

Figure 6A:
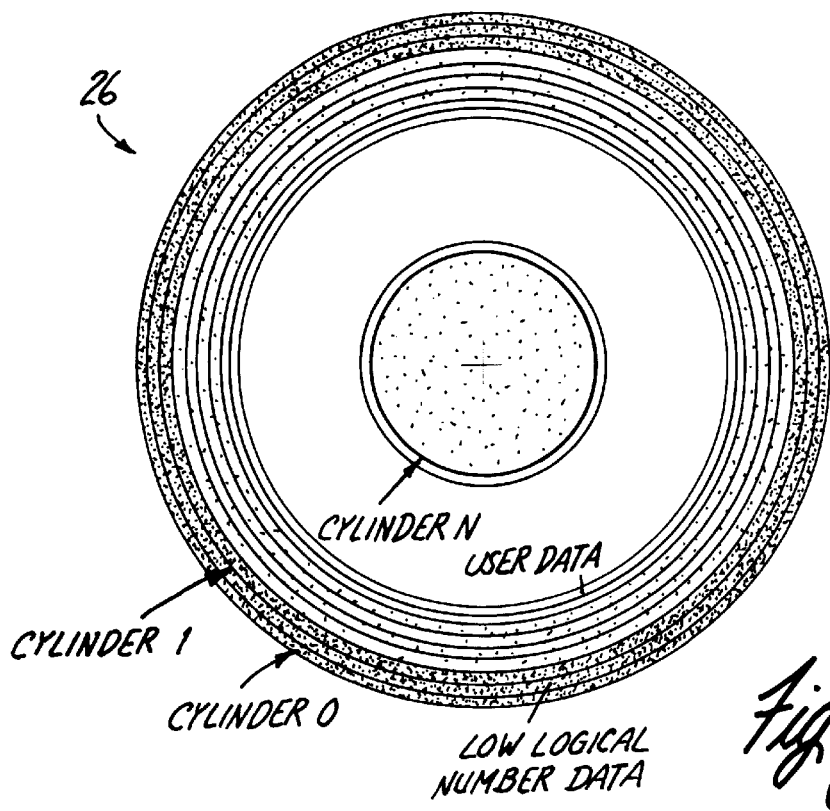
FIG. 6A depicts conventional data storage on a disk.
Figure 6B:
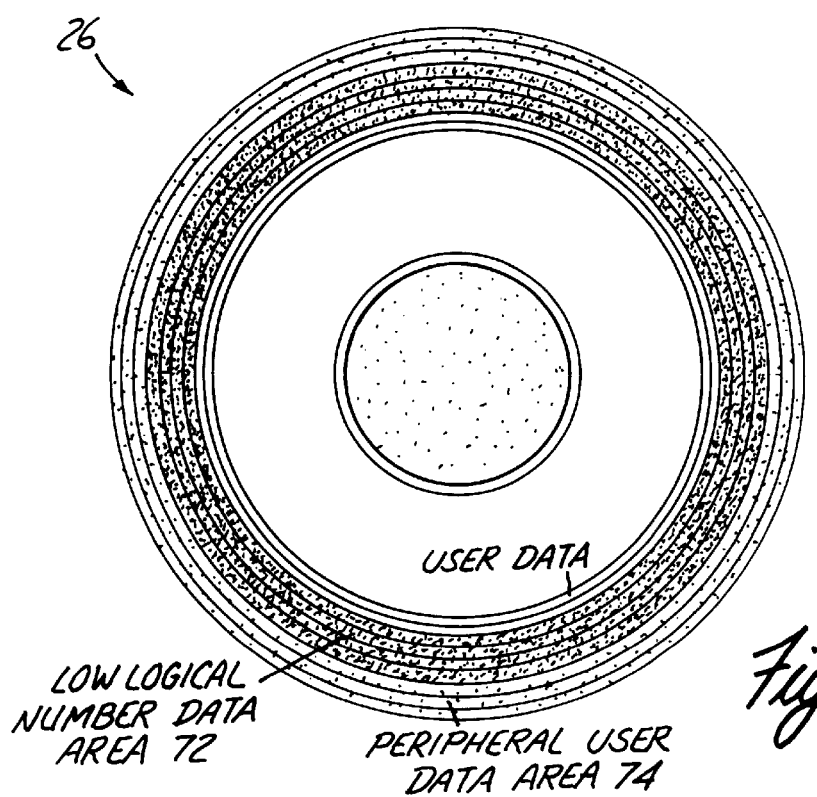
FIG. 6B depicts data storage on a disk resulting from a logical to physical translation in accordance with the teachings of the present invention.

With systems such as DOS and Windows 95 operating with conventional or standard logical to physical translation, low-level data (i.e., boot sector, FAT's, directories, operating system) are stored in the low-logical number addresses available to the host computer. FIG. 6B represents disk data storage according to the present invention where the logical to physical translation of FIG. 4 is used to create a peripheral user data area 74 in the outermost storage units while a low logical number data area 72 is displaced inward from the outermost storage units. Thus, as shown in FIGS. 4 and 6B, logical to physical translation 60 causes selected low logical number data of a first type, corresponding to logical addresses 1 through M, to be stored in physical storage units M+1 to 2M, which correspond to the low-logical number data area 72 of FIG. 6B. In turn, user data corresponding to logical addresses M+1 to 2M is stored in the outer physical storage units 1 through M, which correspond to the peripheral user data area 74 of FIG. 6B.

(With FIG. 4, all storage units for each stage of the translation are referenced sequentially with numbers ranging from 1 to $N_{s.u.}$ wherein $N_{s.u.}$ is the total number of partition storage units available to the host computer. It should be recognized, however, that logical and physical storage units may be (and usually are) addressed with different identifiers (e.g., block or sector numbers for logical addresses and cylinder/head/sector identifiers for physical addresses). Nonetheless, every logical storage unit address has a corresponding physical address pursuant to a logical to physical translation. In addition, the standard sequential logical to physical translation 62 is depicted in the first stage of FIG. 4 as a single logical to physical translation. However, persons skilled in the art will recognize that a standard logical to physical translation may include multiple translations. For example, with an SCSI hard disk drive in connection with a DOS system, the standard logical to physical translation may actually include three separate translations; two separate standard logical to physical translations cascaded together by a physical to logical translation. First, a logical DOS sector is converted into its physical cylinder, head, sector value. The BIOS then converts this physical value into a logical block for the SCSI host adaptor. Finally, the SCSI disk drive controller converts the logical block address into its corresponding physical cylinder, head, sector value for the SCSI disk drive.)

c. A Translation/Displacement by Substitution Routine

FIG. 5 illustrates routine 100 which, when implemented in software and/or hardware and executed, performs one embodiment of the invention by (1) receiving a data transfer command at step 110; (2) performing a logical to physical translation 60 pursuant to the present invention at step 120, thereby producing a resulting physical address that displaces data out of the sequence of logical addresses; and (3) at step 130, transferring data between the host computer and the storage unit of the resulting physical address. The resulting physical address includes an inward displacement when data of a first type is the subject of the data transfer command. Because it is desired to displace from the outer most storage units data that would normally be written there, the first type of data can, in this embodiment, be identified by a logical address within a low range, e.g., between 1 and M.

Initially, a data transfer command is received at step 110. After receiving the data transfer command, the routine, at step 121, determines whether the logical storage unit address is between 1 and M (indicating data of the first type), where M is a displacement value that corresponds to the size of the displacement. If the logical address is within address range 1 and M, then at step 123 a standard logical to physical translation is performed on the logical address to yield a corresponding physical address. M address units are then added to this corresponding physical address to produce a resulting physical address. Thus, data of the first type are displaced from the outermost storage units by M address units.

If, however, at step 121 the logical address value is not between 1 and M (i.e., data of the first type are not present), at step 125 the routine determines whether the logical address is greater than M and less than or equal to 2M. If so, a standard logical to physical translation is implemented on the logical address to yield a corresponding physical address at step 127. This time, however, M address units are subtracted from the corresponding physical address to again produce a resulting physical address. The result is displacement of this data toward the outermost storage unit. If, however, at step 125, the logical address is greater than 2M, a standard logical to physical translation, with no displacement, is performed on the logical address to directly produce the resulting physical address at step 129.

Finally, at step 130, data is transferred between the host computer and the disk drive storage unit corresponding to the resulting physical address. (Skilled artisans will recognize that the standard logical to physical translation, which is performed in steps 123, 127 and 129, can be performed prior to determining whether the logical address is within either the first address range at step 121 or the second address range at step 125 because it is performed in all three paths. Moreover, either the logical or its corresponding physical address can be checked at steps 121 and 125.)

Routine 100 may be implemented in and executed by either the host computer 50, the disk drive controller 30, or in combination by both the host computer 50 and the disk drive controller 30. One advantage of performing the logical to physical translation 120 solely within the disk drive controller 30, however, is that the invention may be implemented simply by modifying disk drive controller software, without having to alter the host computer 50, along with its addressing methodology.

d. Selecting Displacement Parameters

With the present invention as embodied in FIGS. 4 and 5, data of a first type are selectively displaced from the outermost storage units. This makes it possible for other data, such as specified user data, to be displaced toward the outermost storage units. In particular, the data transfer rates for user data allocated to the first M logical storage units directly following the displaced low-logical number data, which is allocated logical storage units 1 through M, are improved. The addresses for this user data are translated and the data is actually stored into a peripheral user data area 74, as depicted in FIG. 6B. This data transfer rate enhancement occurs at the expense of reducing the transfer rate of the displaced low logical number data, which includes low-level data. However, such a trade off is warranted in many situations, because typically, the host computer heavily accesses the operating system (which is the major portion of the low-level data) from the disk drive only once at system start up. Thus, it is beneficial to deem certain data (e.g., the operating system and/or other low-level data) as being of a first type not requiring the higher data transfer rates of the outer partition tracks. Moreover, it is beneficial to deem other data (e.g., user data such as a robust, frequently used application program) as requiring the higher data transfer rates associated with these outer tracks.

Accordingly, the order in which user data is loaded onto a disk drive should be considered to insure that user data deemed to require higher data transfer rates is loaded into the peripheral user data area 74. In addition, the size of the physical displacement value M should also be considered because it determines the amount of user data that can be displaced to the higher data transfer rate tracks.

If M equals the number of storage units necessary for storing the displaced low-level data (i.e., the low logical number data area 72 includes just enough storage units to store the low-level data), then the first M storage units of user data stored onto the disk drive partition (after the displaced low-level data has been loaded) will be stored in the peripheral user data area 74.

Alternatively, M may be greater than the expected number of storage units necessary for storing the low-level data (i.e., the low logical number data area 72 is larger than the size of the low-level data). If the data deemed to require the higher data transfer rates would otherwise be stored next, this must be averted. Other user data not requiring higher data transfer rates should be stored into the partition directly after the low-level data has been stored, until all M logical storage units in the low logical number data area 72 have been filled.

Once these M logical storage units in area 72 have been stored, the user data deemed to require the higher data transfer rates can then be loaded into peripheral user data area 74 of the disk drive partition. Alternatively, it may be possible to simply not store any data in the last few storage units in area 72. This may be prudent anyway if the low-level data might be increased by future updates. A benefit of being able to select M to be greater than the storage units needed for low level data is that a user or designer can select the size of the peripheral user data area 74 independently of the size required for the low-level data.

EXAMPLE

With reference to FIG. 4 and Tables A and B below, assume that the storage units are blocks that are each comprised of 16 sectors. Thus, storage unit 1 would be blook 1, storage unit M would be block M and so on. Let M equal 20 and for simplicity, asssume that the disk drive partition comprises a one sided, zone-bit recorded disk having 40 available physical cylinders (cylinder 0–cylinder 39). The block-sector-cylinder format scheme for this example is illustrated below in Table A. As seen from the table, cylinders 0 and 1 each have 80 sectors, cylinders 2 and 3 each have 76 sector cylinders 4 and 5 each have 72 sectors and so on with cylinders 38 and 39 each having 4 sectors. Thus, the disk includes 1,680 sectors, corresponding to 105 memorey blocks which is the value for $N_{su}$. Table B below depicts a conversion table for converting between block and cylinder/head/sector identifiers for this example. Because the logical addresses are in blocks, it also serves as a standard, sequential logical to physical translation table for this example.

TABLE A

Cylinder/Sector/Block Organization For Example

| Cylinder # | Sectors | Blocks |
| --- | --- | --- |
| 0 | 80 | 5 |
| 1 | 80 | 5 |
| 2 | 76 | 4.75 |
| 3 | 76 | 4.75 |
| 4 | 72 | 4.5 |
| 5 | 72 | 4.5 |
| 38 | 4 | 0.25 |
| 39 | 4 | 0.25 |

TABLE B

Block to Cylinder/Head/Sector Addressing For Example

| Block | Address |
| --- | --- |
| 1 | C:0, H:0, S:1 |
| 2 | C:0, H:0, S:17 |
| 20 | C:4, H:0, S:9 |
| 21 | C:4, H:0, S:25 |
| 22 | C:4, H:0, S:41 |
| 103 | C:34, H:0, S:1 |
| 104 | C:35, H:0, S:5 |
| 105 | C:37, H:0, S:1 |

When the logical to physical translation of FIGS. 4 and 5 is applied to the 105 memory blocks, the low-number logical blocks between 1 and 20 (i.e., low logical number data) are displaced upward (or inward) into higher number physical cylinders; and the logical blocks between 21 and 40 are displaced downward (or outward) into the outer physical cylinders. For example, a logical storage unit such as block 1, which is between 1 and 20 and would have a corresponding physical storage unit address of cylinder 0, head 0, sector 1, is displaced upward (or inward) into block 21 (i.e., M+1=21). Thus, its resulting physical storage unit address is cylinder: 4, head: 0, sector: 25. On the other hand, a logical storage unit such as block 22, which is between 21 and 40 and would have a corresponding physical storage unit address of cylinder 4, head 0, sector 40, is displaced downward (or outward) into physical block 2 (i.e., 22−M =2), thereby producing a resulting physical address of cylinder: 0, head: 0, sector: 17. A logical storage unit such as block 104, which is neither between 1 and M nor M+1 and 2M, is not displaced at all; its resulting physical address is the same as its corresponding physical address of cylinder: 35, head: 0, sector: 5. With this example, the peripheral user data area, which includes 20 blocks of memory, occupies all of the 4 outer cylinders (cylinder 0–cylinder 3) and one-third of cylinder 4.

Now, in addition, assume that for this example there are only 18 blocks of low-level data to be stored (e.g., 2 blocks for boot sectors, FATs and directories, and 16 blocks for an operating system). Then, for selected user data requiring higher data transfer rates to be stored in the peripheral user data area, 2 blocks of additional data not deemed to require higher data transfer rates would have to be stored onto the disk drive after the 18 blocks of low-level data are stored and immediately prior to storing the user data deemed to require the higher data transfer rates. On the other hand, if the low-level data consumed all 20 memory blocks, then the next 20 blocks of user data stored onto the disk drive would be stored into the peripheral user data area 74.

Other Embodiments

Figure 7:
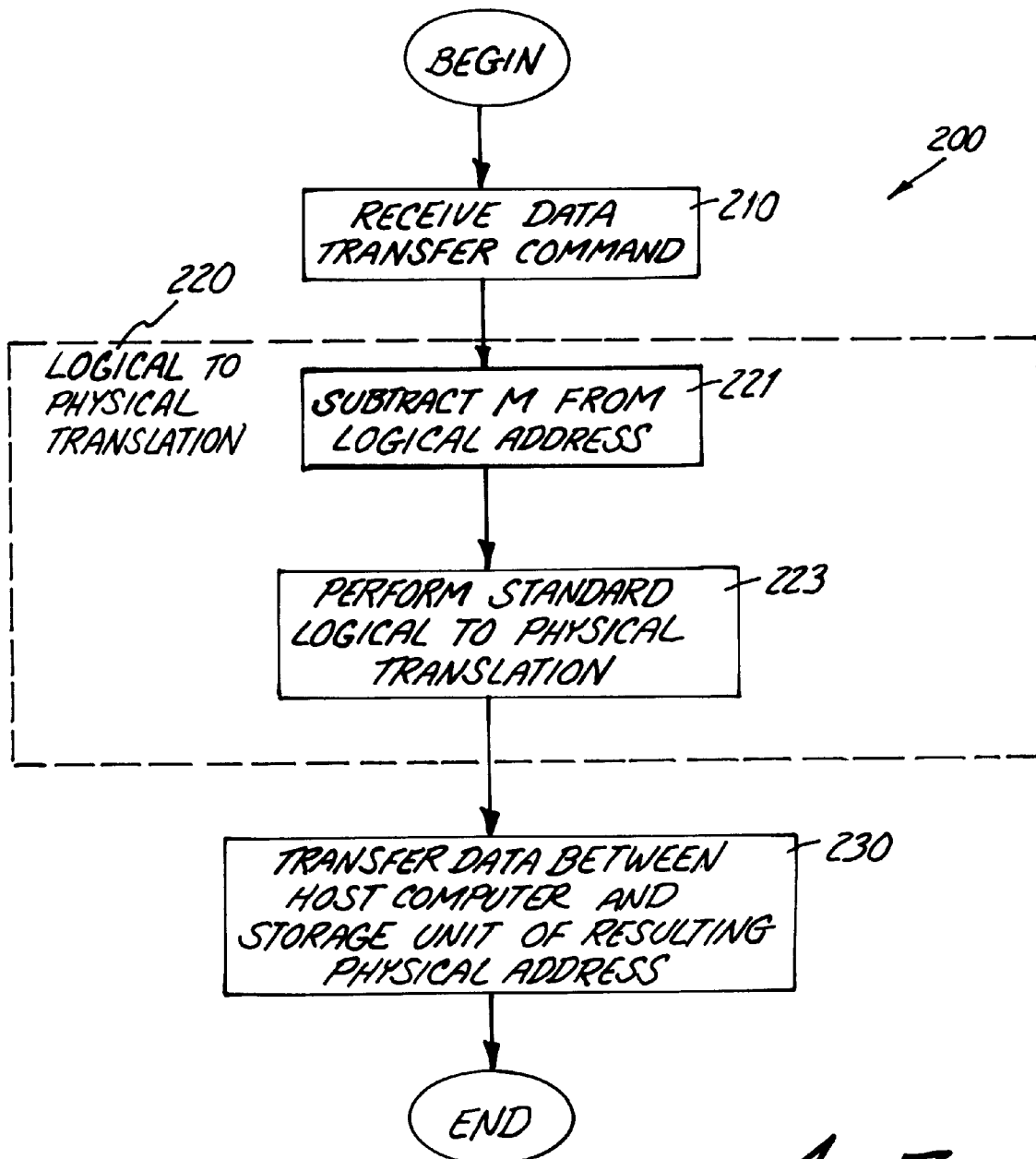
FIG. 7 is a flow chart depicting a routine for implementing an additional embodiment of the present invention.
Figure 8:
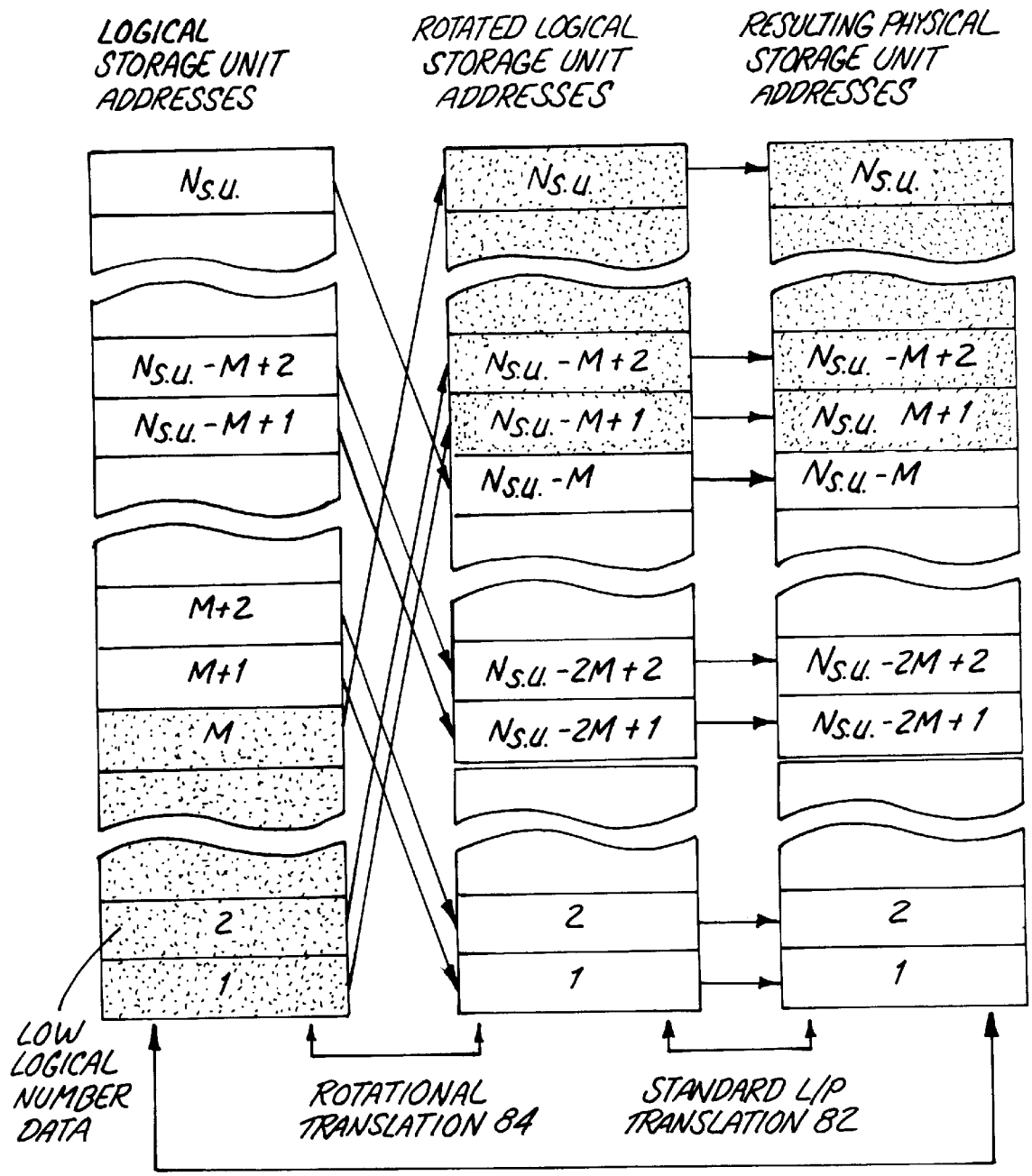
FIG. 8 is a graphical representation of the logical to physical translation performed by the routine of FIG. 7.

FIGS. 7 and 8 depict another embodiment of a logical to physical translation 80 in accordance with the present invention. With this embodiment, however, a "rotational" translation 84 rather than a substitution translation is performed along with a standard logical to physical translation 82.

A rotational translation is the "shifting" of all storage unit addresses by some displacement value M for the redirection of data from a first logical or physical address into a second logical or physical address. One can think of the storage units as being circularly connected at their upper and lower ends of the address sequence. Thus, the addresses "rollover" at $N_{s.u.}$ (going upward from $N_{s.u.}$ to 1) and at 1 (going downward from 1 to $N_{s.u.}$). With a rotational translation, all storage unit addresses, either logical or physical, are displaced upward or downward by adding the displacement value M to or subtracting it from a given address. As with substitution translation, the resulting physical address sequence is changed with respect to that of the logical addresses. However, here the sequence is changed by displacing all data and by shifting data that would fall outside the normal storage boundaries to the other end of the storage sequence. As illustrated in FIG. 8, the data corresponding to the first 1 to M storage units leave their position at the start of the sequence, so that physically this data now appears at the end of the sequence.

In this manner, low-logical number data (which may include low level data) can be shifted sufficiently upward or downward (as is depicted in FIG. 8) into the high number (inner) physical storage units of the disk drive partition. In turn, user data is caused to "fall" into lower number, outer physical storage units. (Note that if addresses are shifted upward sufficiently for low-level data to be stored in the innermost cylinders, then user data that would otherwise have been stored on those innermost cylinders is caused to be stored on the outermost cylinders. In contrast, if the addresses are shifted sufficiently downward to cause the low-level data to be stored in the innermost cylinders, then the user data that otherwise would have been stored immediately interior to the low-level data is caused to be stored on the outer cylinders.)

FIG. 7 illustrates routine 200 which, when implemented in software and/or hardware and executed performs the method of FIG. 8 by (1) receiving a data transfer command at step 210, (2) performing a logical to physical translation at step 220, thereby producing a resulting physical address, and (3) at step 230, transferring data between the host computer and the storage unit of the resulting physical address.

Routine 200 executes the logical to physical translation 220 by (1) subtracting M address units from the logical address, thereby producing a rotationally shifted logical address at step 221, and (2) performing a standard logical to physical translation on the shifted logical address to produce a resulting physical address at step 223. Finally, at step 230, data is transferred between the host computer and the disk storage unit corresponding to the resulting physical address.

With this embodiment, the logical storage unit addresses are rotated (or shifted) downward prior to the standard logical to physical translation stage. One potential benefit of this scheme is that the user data does not become fragmented; rather, it can be shifted downward as a unit to lower number physical storage units, which generally have higher associated data transfer rates.

Another aspect of this embodiment (which can apply to any logical to physical translation of the present invention) is that the rotational translation is performed on the logical, rather than on the corresponding physical, address. Thus, the rotational translation could readily be performed by the host computer 50, as well as by the controller 30, when a standard logical to physical translation is being performed by the controller 30.

The value for M may be predefined by a user or designer. In addition, with this or any other embodiment of the invention, M may also be derived by the controller 30 or the host computer 50 before any data is actually loaded into the disk storage device. In this manner, M can automatically correspond to the number of storage units allocated and/or used by the host computer for low-level data, regardless, for example, of the size of a particular user's operating system. This can ensure, for example, that the first user data to be loaded into the partition will be stored in lower number physical storage units.

While the present invention has been described with reference to several embodiments thereof, those skilled in the art will recognize various changes that may be made without departing from the spirit and scope of the claimed invention.

The logical to physical translations set forth above are only several of numerous embodiments suitable for practicing the present invention. For example, the logical to physical translations for performing the present invention have been presented as comprising multiple, cascaded sub-translations: a standard and either a separate substitution or a separate rotational translation. However, a logical to physical translation in accordance with the present invention can actually be implemented (whether through formula, map, or table) with a single translation stage (e.g., by modifying a standard logical to physical translation to incorporate the principles of the other translation).

Accordingly, the invention is not limited to what is shown in the drawings and described in the specification but only as indicated in the appended claims.

What is claimed is:

1. A computer system having a disk storage device with an improved data storage scheme, the system comprising:
   a host computer;
   a disk storage device having at least one outer track capable of a higher data transfer rate than at least one inner track located inward from the at least one outer track; and
   a controller for controlling the transfer of data between the host computer and the disk storage device and having an associated memory that stores program instructions that when executed cause the controller to perform acts including:
   (a) receiving a data transfer command that includes data and a logical address that is part of a sequence of logical addresses;
   (b) performing a logical to physical translation on the logical address to produce a resulting physical address that selectively displaces the data inward or outward, out of the sequence of logical addresses responsive to a determination of whether the data does or does not require the higher data transfer rate; and
   (c) transferring the data between the host computer and the disk storage device at the resulting physical address.

2. The system of claim 1, wherein the program instructions include instructions that when executed cause the controller to:
   perform a standard sequential logical to physical translation; and
   perform a substitution translation.

3. The system of claim 2, wherein the program instructions include instructions that when executed cause the controller to increase a corresponding physical address by a first displacement value if the logical address is within a first address range.

4. The system of claim 3, wherein the program instructions include instructions that when executed cause the controller to decrease the corresponding physical address by the first displacement value if the logical address is within a second address range.

5. The system of claim 2, wherein the program instructions include instructions that when executed cause the controller to increase a corresponding physical address by a first displacement value if the corresponding physical address is within a first address range.

6. The system of claim 5, wherein the program instructions include instructions that when executed cause the controller to decrease the corresponding physical address by the first displacement value if the corresponding physical address is within a second address range.

7. The system of claim 2, wherein the program instructions include instructions that when executed cause the controller to increase the logical address by a first displacement value if the logical address is within a first address range.

8. The system of claim 1, wherein the program instructions include instructions that when executed cause the controller to receive a transfer command for a first type of data deemed not to require a higher data transfer rate.

9. The system of claim 8, wherein the program instructions include instructions that when executed cause the controller to displace the data of the first type inward on the disk storage device.

10. The system of claim 9, wherein the data of the first type includes an operating system.

11. The system of claim 1, wherein the program instructions include instructions that when executed cause the controller to:
   perform a standard sequential logical to physical translation; and
   perform a rotational translation.

12. The system of claim 11, wherein the program instructions include instructions that when executed cause the controller to decrease an address by a first displacement value.

13. The system of claim 11, wherein the program instructions include instructions that when executed cause the controller to decrease a corresponding physical address by the first displacement value.

14. The system of claim 11, wherein the program instructions include instructions that when executed cause the controller to decrease the logical address by the first displacement value.

15. The system of claim 11, wherein the program instructions include instructions that when executed cause the controller to increase an address by a first displacement value.

16. The system of claim 15, wherein the program instructions include instructions that when executed cause the controller to increase a corresponding physical address by the first displacement value.

17. The system of claim 15, wherein the program instructions include instructions that when executed cause the controller to increase the logical address by the first displacement value.

18. A computer system having a disk storage device with an improved data storage scheme, the system comprising:
   a host computer;
   a disk storage device having a plurality of concentric cylinders including storage units distributed substantially consistently with zone bit recording to produce at least one outer track capable of a higher data transfer rate than at least one inner track located inward from the at least one outer track; and
   a controller for controlling the transfer of data between the host computer and the disk storage device and having an associated memory that stores program instructions that when executed cause the controller to perform acts including:
   (a) receiving a data transfer command, the data transfer command including a logical address that is part of a sequence of logical addresses;
   (b) performing a logical to physical translation on the logical address to produce a resulting physical address that displaces data outward or inward, responsive to a determination of whether the data does or does not require the higher data transfer rate; and
   (c) transferring data between the host computer and the storage unit corresponding to the resulting physical address.

19. The system of claim 18, wherein the program instructions include instructions that when executed cause the controller to:
   perform a standard sequential logical to physical translation; and
   perform a substitution translation.

20. The system of claim 19, wherein the program instructions include instructions that when executed cause the controller to increase a physical address by a first displacement value if the physical address is within a first address range.

21. The system of claim 19, wherein the program instructions include instructions that when executed cause the controller to increase a physical address by a first displacement value if the logical address is within a first address range.

22. The system of claim 19, wherein the program instructions include instructions that when executed cause the controller to increase the logical address by a first displacement value if the logical address is within a first address range.

23. The system of claim 19, wherein the program instructions include instructions that when executed cause the controller to increase a physical address by a first displacement value if low-level data is to be transferred.

24. The system of claim 19, wherein the program instructions include instructions that when executed cause the controller to increase the logical address by a first displacement value if low-level data is to be transferred.

25. The system of claim 18, wherein the program instructions include instructions that when executed cause the controller to:
   perform a standard sequential logical to physical translation; and
   perform a rotational translation.

26. The system of claim 25, wherein the program instructions include instructions that when executed cause the controller to decrease an address by a first displacement value.

27. The system of claim 26, wherein the program instructions include instructions that when executed cause the controller to decrease a corresponding physical address by the first displacement value.

28. The system of claim 26, wherein the program instructions include instructions that when executed cause the controller to decrease the logical address by the first displacement value.

29. The system of claim 25, wherein the program instructions include instructions that when executed cause the controller to increase an address by a first displacement value.

30. The system of claim 29, wherein the program instructions include instructions that when executed cause the controller to increase a corresponding physical address by the first displacement value.

31. The system of claim 29, wherein the program instructions include instructions that when executed cause the controller to increase the logical address by the first displacement value.

32. The system of claim 20, 21, 22, 23, 24, 26, 27, 28, or 29, wherein the first displacement value is derived by the controller to correspond to the number of storage units allocated for low-level data.

33. The system of claim 18, wherein the disk storage device includes a partition that has an operating system and peripheral user data, wherein the operating system is stored on higher number physical storage units than those used for storing the peripheral user data.

34. A computer system having a disk storage device with an improved data storage scheme, the system comprising:
   a host computer;
   a disk storage device having a plurality of concentric tracks containing storage units distributed such that at least one outer track has greater storage unit density per track than at least one track located inward from the at least one outer track, yielding at the outer track a higher data transfer rate than at the at least one inward track; and
   a controller for controlling the transfer of data between the host computer and the disk storage device and having an associated memory that stores program instructions that when executed cause the controller to perform acts including:
      (a) receiving for a first type of data deemed not to require a higher data transfer rate a data transfer command that includes an address that is part of a sequence of addresses;
      (b) performing a translation on a logical address to produce a resulting physical address that selectively displaces the data of the first type out of the sequence of addresses and locates said data onto said at least one inward track responsive to a determination that the data is data of the first type; and
      (c) transferring the data of the first type between a host computer and a storage unit at the resulting physical address.

35. The system of claim 34, wherein the program instructions include instructions that when executed cause the controller to:
   perform a standard sequential logical to physical translation; and
   perform a substitution translation.

36. The system of claim 35, wherein the program instructions include instructions that when executed cause the controller to increase the corresponding physical address by a first displacement value if the corresponding physical address is within a first address range.

37. The system of claim 34, wherein the program instructions include instructions that when executed cause the controller to:
   perform a standard sequential logical to physical translation; and
   perform a rotational translation.

38. A memory storage device having program instructions that when executed within a computer system cause the system to perform a method for storing data on a disk storage device having a plurality of concentric tracks containing storage units distributed such that at least one outer track has greater storage unit density per track than at least one track located inward from the at least one outer track, yielding at the outer track a higher data transfer rate than at the at least one inward track, the method comprising:
   receiving a data transfer command that includes data and a logical address that is part of a sequence of logical addresses;
   performing a logical to physical translation on the logical address to produce a resulting physical address that selectively displaces the data, inward or outward out of the sequence of logical addresses, responsive to a determination of whether the data does or does not require the higher data transfer rate; and
   transferring the data between a host computer and a storage unit at the resulting physical address.

39. A memory storage device having program instructions that when executed within a computer system cause the system to perform a method for storing data on a disk storage device having a plurality of concentric tracks containing storage units distributed such that at least one outer track has greater storage unit density per track than at least one track located inward from the at least one outer track, yielding at the outer track a higher data transfer rate than at the at least one inward track, the method comprising:
   receiving for a first type of data deemed not to require the higher data transfer rate a data transfer command that includes a logical address that is part of a sequence of logical addresses;

performing a logical to physical translation on the logical address to produce a resulting physical address that displaces the data of the first type out of the sequence of logical addresses and locates said data on said at least one inward track; and transferring the data of the first type between a host computer and the resulting physical address.

40. A memory storage device having program instructions that when executed within a computer system cause the system to perform a method for storing data on a disk storage device having a plurality of concentric cylinders containing storage units distributed substantially consistent with zone bit recording to produce at least one outer track capable of a higher data transfer rate than at least one inner track located inward from the at least one outer track, the method comprising:

receiving a data transfer command, the data transfer command including a logical address that is part of a sequence of logical addresses;

performing a logical to physical translation on the logical address to produce a resulting physical address that selectively displaces data outward or inward, responsive to a determination of whether the data does or does not require the higher data transfer rate; and transferring said data between a host computer and the storage unit of the resulting physical address.

41. A computer system with an improved disk storage scheme, the system comprising:

a host computer; and a disk storage device to store data received from the host computer, the disk storage device, having at least one outer track capable of a higher data transfer rate than at least one inner track located inward from the at least one outer track and further having a low logical number data area and a peripheral user data area, said peripheral user data area including the at least one outer track, wherein the disc storage scheme comprises performing a logical to physical translation on a logical address included together with data in a data transfer command to produce a resulting physical address that selectively displaces the data inward to the low logical number data area or outward to the peripheral user data area, departing from a sequence of logical addresses, responsive to a determination of whether the data does or does not require the higher data transfer rate.

42. The computer system of claim 41, wherein the low logical number data area includes low level data.

43. The computer system of claim 42, wherein the low level data includes an operating system.

44. The computer system of claim 43, wherein the peripheral user data area includes the first user data to be loaded onto the disk storage device by a user.

45. A disk storage device comprising:

a plurality of concentric tracks containing storage units distributed such that at least one outer track has greater storage unit density per track than at least one track located inward from the at least one outer track, whereby the at least one outer track yields a higher data transfer rate than the at least one inward track;

wherein a first type of data deemed not to require the higher data transfer rate is stored at the at least one inward track by execution of stored program instructions to perform acts including:

(a) receiving a data transfer command that includes data and a logical address that is part of a sequence of logical addresses (b) performing a logical to physical translation on the logical address to produce a resulting physical address that selectively displaces the data inward, out of the sequence of logical addresses, responsive to a determination that the data does not require the higher data transfer rate; and (c) transferring the data between the host computer and the disk storage device at the resulting physical address.

46. The disk storage device of claim 45 further comprising a controller for storing the first type of data at the at least one inward track.

47. A controller for storing data on a disk storage device that has a plurality of concentric tracks containing storage units distributed such that at least one outer track has greater storage unit density per track than at least one track located inward from the at least one outer track, yielding at the outer track a higher data transfer rate than at the at least one inward track, the controller comprising:

(a) an input port to receive a transfer command that includes data and a logical address that is part of a sequence of logical addresses;

(b) a processing unit for performing a logical to physical translation upon the logical address to produce a resulting physical address that selectively displaces the data inward or outward, out of the sequence of logical addresses responsive to a determination of whether the data does or does not require the higher data transfer rate; and (c) an output port in communication with the disk storage device, wherein the data is transferred through the output port to the disk storage device and stored in the storage unit corresponding to the resulting physical address.

48. A controller for storing data on a disk storage device that has a plurality of concentric tracks containing storage units distributed substantially consistent with zone bit recording to produce at least one outer track capable of a higher data transfer rate than at least one inner track located inward from the at least one outer track, the controller comprising:

(a) an input port for receiving a transfer command that includes data and a logical address that is part of a sequence of logical addresses, (b) a processing unit for performing a logical to physical translation upon the logical address to produce a resulting physical address that selectively displaces the data inward or outward out of the sequence of logical addresses, responsive to a determination of whether the data does or does not require the higher data transfer rate; and (c) an output port in communication with the disk storage device, wherein the data is transferred through the output port to the disk storage device and stored in the storage unit corresponding to the resulting physical address.

49. A controller for storing data on a disk storage device that has a plurality of concentric tracks containing storage units distributed such that at least one outer track has greater storage unit density per track than at least one track located inward from the at least one outer track, yielding at the outer track a higher data transfer rate than at the at least one inward track, the controller comprising:

(a) an input port to receive a transfer command that includes data and a logical address;

(b) a processing unit for performing a logical to physical translation upon the logical address to produce a resulting physical address that displaces the data onto the at least one inward track if the data is of a first type deemed not to require the higher data transfer rate; and (c) an output port in communication with the disk storage device, wherein the data is transferred through the output port to the disk storage device and stored in the storage unit corresponding to the resulting physical address.

* * * * *